Oct. 13, 1925.
C. WOOD
AIR FILTER
Filed March 13, 1922
1,556,738
2 Sheets-Sheet 1
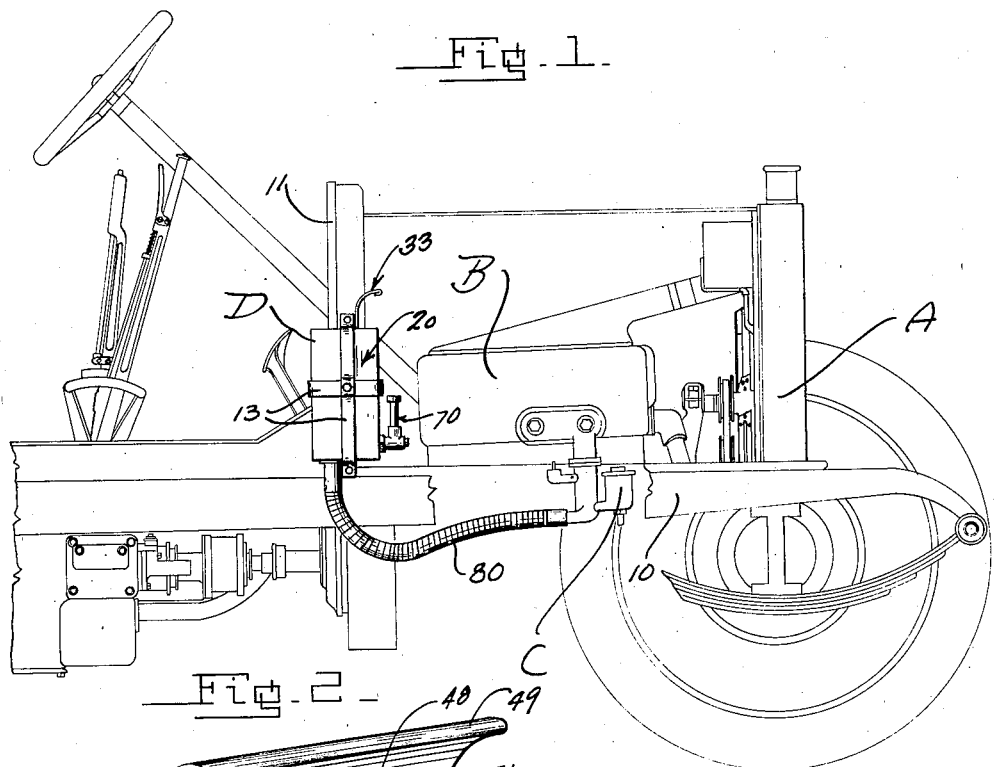
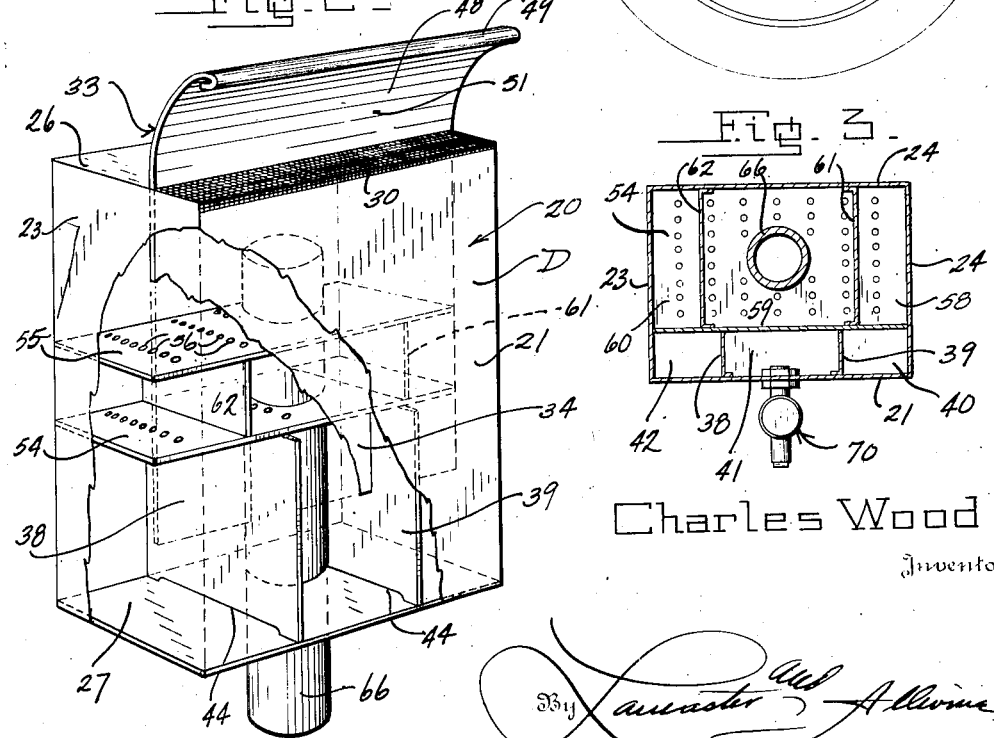
Charles Wood
Inventor

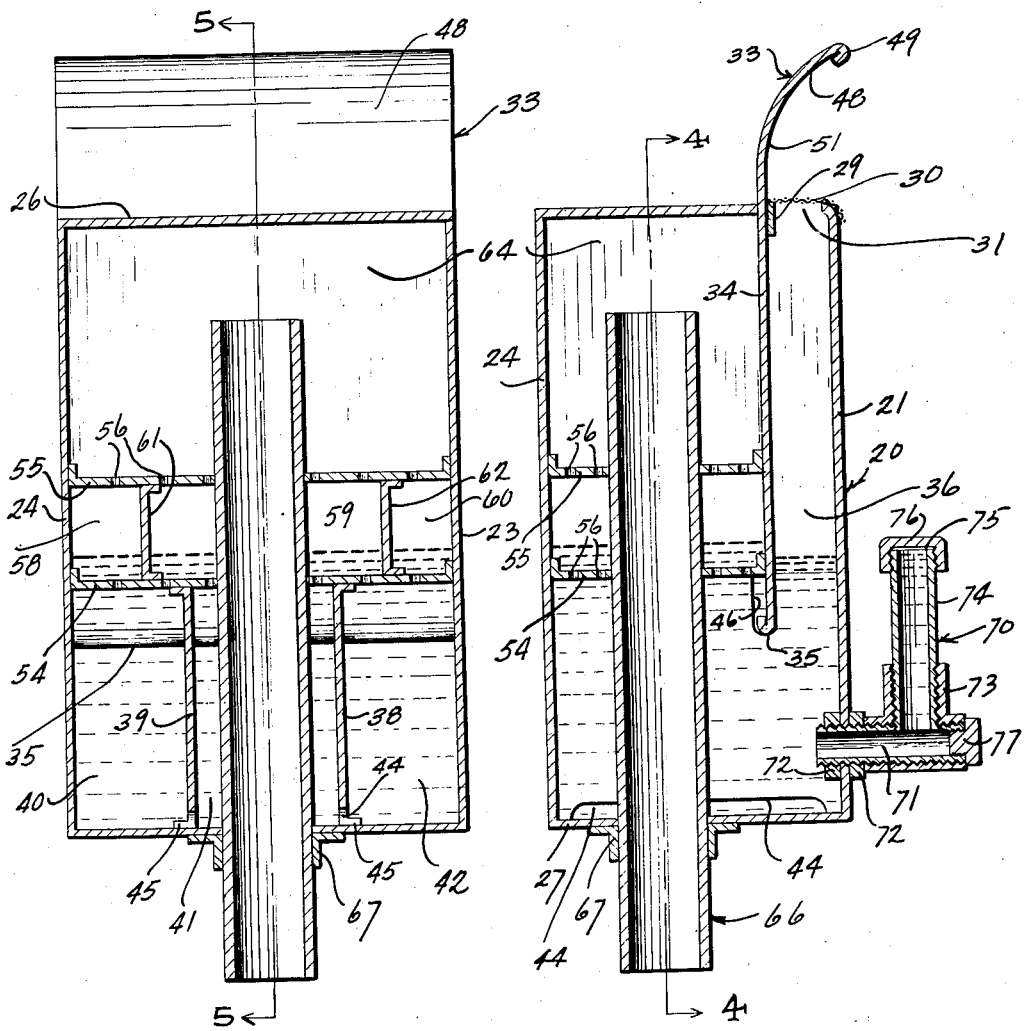

Patented Oct. 13, 1925.

1,556,738

UNITED STATES PATENT OFFICE.

CHARLES WOOD, OF NORDMAN, IDAHO.

AIR FILTER.

Application filed March 13, 1922. Serial No. 543,528.

*To all whom it may concern:*

Be it known that I, CHARLES WOOD, a citizen of the United States, residing at Nordman, in the county of Bonner and State of Idaho, have invented certain new and useful Improvements in Air Filters, of which the following is a specification.

This invention relates to improvements in filtering devices for supplying clean and moist air to the carburetors and cylinders of an internal combustion engine.

The primary object of the invention is the provision of an air filtering device of novel construction adapted for convenient mounting upon a motor vehicle or other supporting structure, whereby air may be properly deflected therethrough, and conveyed through bodies of water therein for supplying washed and moistened air for admixture with the explosive charge of an internal combustion engine.

A further object of the invention is the provision of an air filter for use in connection with carburetors of internal combustion engines including improved means for diverting air thereinto for washing and moistening the same.

Other objects and advantages will be apparent during the course of the following detailed description.

In the accompanying drawings, forming a part of this specification, and wherein similar reference characters designate corresponding parts throughout the several views:

Figure 1 is a fragmentary side elevation of an internal combustion engine as mounted upon a motor vehicle, showing the manner in which the air filtering device is susceptible of attachment to the motor vehicle and carburetor of the internal combustion engine.

Figure 2 is a fragmentary perspective view of the improved air filtering device showing cooperating details thereof.

Figure 3 is a horizontal cross sectional view taken through the improved filter and showing the internal arrangement thereof.

Figure 4 is a vertical cross sectional view taken through the improved filter substantially on the line 4—4 of Figure 5.

Figure 5 is a transverse cross sectional view taken longitudinally of the improved air filter, substantially on the line 5—5 of Figure 4.

In the drawings, wherein for the purpose of illustration is shown the preferred embodiment of the air filter, the letter A designates a motor vehicle of any approved type embodying an internal combustion engine B, and carburetor C; said motor vehicle A having the improved air filter device D mounted thereon.

The motor vehicle A, may of course, be of any type, and including a chassis frame 10 upon which the internal combustion engine B is mounted, and a dash 11.

The improved air filter arrangement D may be conveniently mounted in any position for use in connection with the internal combustion engine B or the carburetor C. In the case of a stationary internal combustion engine, the filter D may be appropriately mounted on any support. However, as used in connection with the motor vehicle A, the air filter D is preferably mounted upon the dash arrangement 11, laterally of the motor vehicle, and by the clamping brackets 13. However, it is not essential that the air filter D be mounted in any particular position, although it is, to a certain extent, desirable that the air filter be so located as to be capable of diverting a flow of air thereinto, for purposes which will be subsequently set forth.

The air filter A preferably includes a casing 20 of sheet metal, the same being substantially rectangular in formation, including front and rear walls 21 and 22 respectively; side walls 23 and 24; and top and bottom walls 26 and 27 respectively. The top wall 26 is preferably provided adjacent the front wall 21 with an opening 31 extending for the entire width of the casing 20. A strip of material 29 is preferably disposed adjacent the edge of the top wall 26 which faces the top marginal edge of the front wall 21; this strip 29 being provided for cooperation with the top marginal edge of the front wall 21 to receive a gauze like screen 30 of foraminous material, which in fact provides a covering for the inlet opening 31.

A deflecting plate 33 is provided for insertion into the casing 20, including a portion 34 which is adapted for disposition downwardly through the casing 20, whereby the lower marginal edge 35 thereof may be spaced upwardly from the bottom 27. This deflecting plate 33 is disposed parallel with the front wall 21, extending from side 23 to side 24 of the casing 20, and thus providing a relatively shallow passageway 36, extending for the entire width of the casing 20, and which passageway of course, terminates at the marginal edge 35 of said plate 33.

The lower interior of the casing 20 is subdivided into a plurality of compartments, by the placement interiorly of the casing of a pair of partition plates 38 and 39, which extend parallel to the side walls 23 and 24 of said casing; and being preferably disposed at right angles to the front and rear walls thereof and extending from the front to the rear wall. Thus, the lower part of the interior is subdivided into three compartments 40, 41 and 42, intercommunication between said compartments being had by means of passageways or openings 44, in each of the partition plates 38 and 39 upon its lower marginal edge and immediately upwardly from the casing bottom 27. These plates 38 and 39 are preferably soldered or otherwise secured by the attaching feet 45 disposed or flanged thereon at the ends of the communicating openings 44. Each of the plates 38 and 39 are provided with a recess 46 extending downwardly from their top marginal edges, and in fact provided for receiving the lower marginal edge 35 of the deflecting plate 34 thereagainst, in order to limit downward movement of said deflecting plate interiorly of the casing 20.

The upper portion 48 of the deflecting plate 33 is bent arcuately forwardly over the inlet opening 31 of the casing 20, the top marginal edge 49 of this arcuate portion 38 being, of course, spaced upwardly from the casing 20. By this structure, the concave face 51 of this deflecting plate upper portion 48 will receive flow of air thereagainst for diverting the same downwardly into the inlet opening 31 and through the passageway 36 into the compartments 40, 41 and 42, above described.

Spaced screen members 54 and 55 preferably of sheet material, and having series of apertures 56 therein are provided interiorly of the casing 20 upwardly from the top marginal edges of the partition plates 38 and 39, and in spaced relation to each other. It is preferred that the lower screen 54 rest immediately upon the top marginal edges of the partition plates 38 and 39 and between the deflecting plate 33 and rear wall 24. The upper screen 55 is placed immediately over, although spaced for a short distance from the lower screen 54, and disposed in parallel relation thereto, being of practically the same size as the lower screen 54 and disposed interiorly of the casing 20 in the same relation. The space intermediate the screens 54 and 55 is subdivided into three compartments 58, 59 and 60 by means of a pair of laterally disposed partition walls 61 and 62 which are preferably disposed vertically in the casing and parallel to the walls 38 and 39. A relatively large interior compartment 64 is provided in the casing 20 above the top screen 55, extending from side wall to side wall of said casing, and from the deflecting plate 33 to the rear wall 24.

A conduit or air conducting pipe 66, is provided, vertically disposed in the casing 21, open at both ends, and preferably so placed upwardly through the bottom 27 of the casing 20 as to extend through the top and bottom screens 55 and 54 respectively, substantially centrally thereof, whereby the upper open end of this conduit 66 opens into the upper casing compartment 64 immediately below the top wall 26. The bottom 27 of the casing, is provided with a reinforcing ring or flange 67, engaging about the conduit 66, said conduit 66 extending below the bottom of the casing.

A water filling arrangement 70 is provided in the forward wall 21 of the casing 20, which leads directly into the central compartment 41 as provided in said casing intermediate the partitions 38 and 39. This filling arrangement 70 preferably includes a pipe portion 71 leading in horizontal manner into the compartment 41 immediately upwardly of the bottom 27, and affixed in position as by the clamping nuts 72. A T-shaped connection 73 is preferably provided exteriorly upon this pipe portion 71, and extends upwardly to receive a filler pipe portion 74 positioned substantially vertically. The extreme upper marginal edge 75 of this filler pipe 74 bears a definite relation to the top surface of the lower screen plate 54, being upwardly disposed with respect thereto for a predetermined distance, in order that the water within the air filter may cooperate in the proper working manner with the air flowing therethrough. A cap 76 may be provided upon the upper portions of the filler pipe 74. A drain plug 77 may likewise be provided in the end of the attaching pipe portion 71, in order that water from the casing 20 may be drained outwardly from this portion 71.

In filling the casing 20, the cap 76 is first removed from the filler arrangement 70. The water is poured downwardly into the filler pipe portion 74 and of course, flows into the central compartment 41, from which compartment the water flows through the lower passageways 44 into the lateral compartments 40 and 42. This flowing of water into the casing 20, of course continues until the lower compartments 40, 41 and 42 are filled, and when the water has reached the top marginal edge 75 of the filler pipe 74, the water interiorly of the casing 20 will be at a level just above the lower screening plate 54. It can therefore be seen that there is no liability of over or under filling of the casing 20, since by means of the definite relation which the filler pipe 74 bears to the positioning of the lower screen plate 54, the water will always, upon filling operation, be disposed at a level immediately above said screening plate.

The improved air filter D is mounted, as above described, to the motor vehicle A, and a flexible conveying tube 80 may be provided upon the depending portion of the air conduit pipe 66, and leading to the carburetor C. In this position, the front wall 21, of course, faces the direction of travel of the motor vehicle A. As the motor vehicle A travels forwardly, the flowing air will contact against the concave face 51 of the deflecting plate 33 and be diverted downwardly into the passageway 36. When the air so diverted into the casing 20 comes in contact with the water level, the pressure upon the water in the passageway 36 will be such as to slightly force the water upwardly into the compartments 58, 59 and 60, as can readily be understood.

The engine B, under operation, will supply a suction in the flexible tube 80, due to the piston action in the cylinders thereof, and consequently the suction will be transferred inwardly of the casing compartment 64. This results in lower pressure in this compartment than is in the passageway 36 interiorly of the casing, and consequently air will be filtered under the marginal edge 35 of the deflecting plate 33, into the lower compartments 40, 41 and 42, upwardly through the apertures in the lower screen 54, into the intermediate compartments 58, 59 and 60, and finally through the apertures in the top screen 55 into the compartment 64. This operation forcing the air through these compartments in the casing 20 and into the passageway of the conduit 66 will, of course, provide highly moistened air for feeding through the flexible tube 80 into the carburetor C.

The internal arrangement and subdivision of the casing 20 is of practical importance in so far as the effective provision of moistened air to the carburetor C is concerned. In the first place, by means of partition plates 38 and 39, the air being sucked into the water filled compartments 40, 41 and 42, will be prevented from forcing the water therein laterally from side wall to side wall of the casing, since necessarily the water in the lower compartment cannot communicate with the adjacent compartment except through the bottom passageways 44. By the provision of the lower relatively coarse screen 54, the waving effect of the water, due to filtering of air therethrough, is to a certain extent, quieted. The partition walls 61 and 62 provided intermediate the screening plates 54 and 55, likewise prevent undue rocking or splashing of the water in the compartments 58, 59 and 60. By the provision of the relatively coarse upper screening plate 56, the water which might splash in these intermediate compartments will dash thereagainst, and be prevented from splashing upwardly into the top compartment 64, from whence it might flow downward into the conduit 66. Thus, by the time the air filters through the lower and intermediate compartments into the top compartments 64, the same is cleaned, and moistened for providing an effective supply for the carburetor C.

From the foregoing, it can be seen that an air filter device has been provided, which is of novel construction, inasmuch as thereby, air can be properly filtered through water without liability of any splashing or flow of water into the carburetor, such as is apt to occur with ordinary types of air strainers or filters.

Various changes in the shape, size and arrangement of parts may be made to the form of the air filter herein shown and described, without departing from the spirit of the invention, or the scope of the claims.

I claim:

1. An air filter comprising a casing having an air inlet opening in the forward portion of its upper wall, vertically disposed supporting plates in the lower portion of said casing having slots leading from their upper edges, an air deflecting plate extending into the casing through the opening in the upper wall thereof and having its lower end portion fitting into the slots of said supporting plates whereby said air deflecting plate may be supported and braced by said supporting plates, upper and lower filtering plates disposed horizontally in said casing between the air deflecting plate and rear wall of the casing with the lower filtering plate resting upon the upper edges of said supporting plates, supports for the upper filtering plate positioned between the upper and lower filtering plates, and an air outlet pipe extending into the casing through the bottom thereof and extending upwardly through the filtering plates to a point above the upper filtering plate.

2. An air filter comprising a casing having an air inlet opening in the forward portion of its upper wall, vertically disposed supports in the casing extending from its bottom to a point intermediate its height and having slots leading from their upper ends, an air deflecting plate extending into the casing through the air inlet opening and having its lower end seated in the slots of said supports, connected upper and lower filtering plates disposed horizontally in the casing between the air deflecting plate and rear wall of the casing with the lower filtering plate resting upon said supports, and an air outlet pipe extending into said casing with its inner end terminating intermediate the upper filtering plate and upper wall of the casing.

CHARLES WOOD.